United States Patent [19]

Smith, II

[11] 4,155,514

[45] May 22, 1979

[54] CONTINUOUS LOOP TAPE CARTRIDGE INCLUDING REWIND MEANS

[76] Inventor: Robert R. Smith, II, 23230 Ravenbury Ave., Los Altos Hills, Calif. 94022

[21] Appl. No.: 836,432

[22] Filed: Sep. 26, 1977

[51] Int. Cl.$^2$ .......................................... B65H 17/48
[52] U.S. Cl. .............................. 242/55.19 A; 242/194; 352/126
[58] Field of Search ............... 242/55.17 A, 193, 194, 242/197–199, 71.6; 352/126, 128; 360/93, 94, 132

[56] References Cited

U.S. PATENT DOCUMENTS

| | | | |
|---|---|---|---|
| 3,252,670 | 5/1966 | Smith | 242/55.19 A |
| 3,894,699 | 7/1975 | Bara | 242/55.19 A |
| 3,924,269 | 12/1975 | Bara | 360/93 |
| 3,999,719 | 12/1976 | Chan | 242/55.19 A |
| 4,015,789 | 4/1977 | Lace | 242/55.19 R |
| 4,034,927 | 7/1977 | Leshik | 242/56 R |

Primary Examiner—Leonard D. Christian
Attorney, Agent, or Firm—Flehr, Hohbach, Test, Albritton & Herbert

[57] ABSTRACT

A continuous loop tape cartridge including a housing in which an endless tape is wound as a coil on a main hub disposed within the housing. During operation the tape is withdrawn from the center of the coil and wound onto the outside of the coil. A rewind hub is coaxially mounted with respect to the main hub and includes an accessible portion adapted to be driven to rewind the tape from the outer convolution of the coil onto the rewind hub.

13 Claims, 5 Drawing Figures

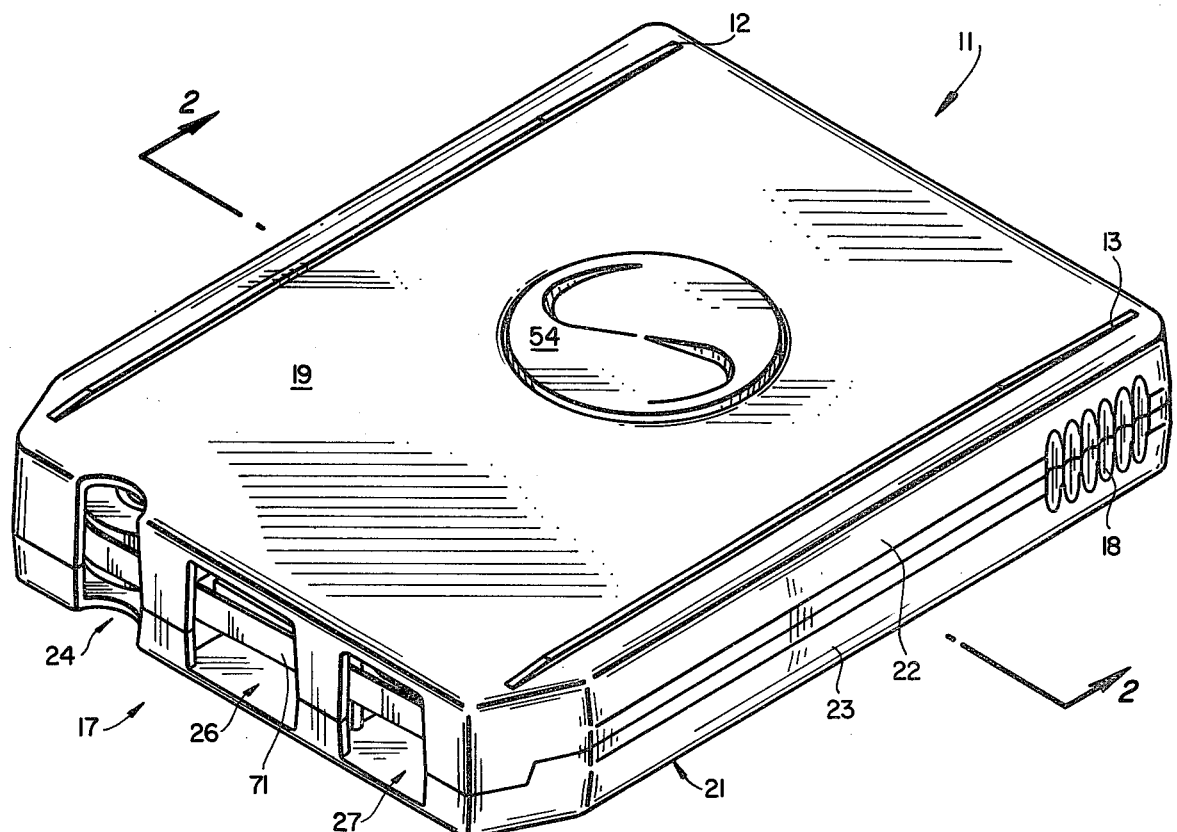
FIG__1
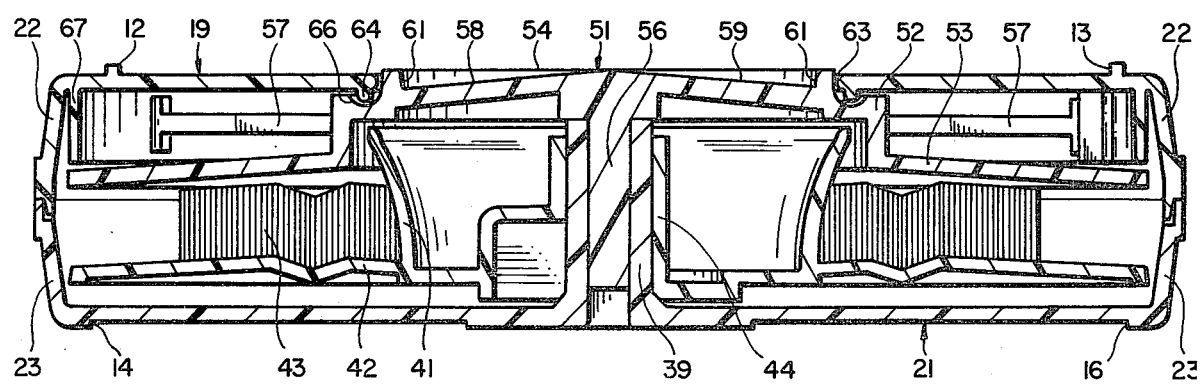
FIG__2

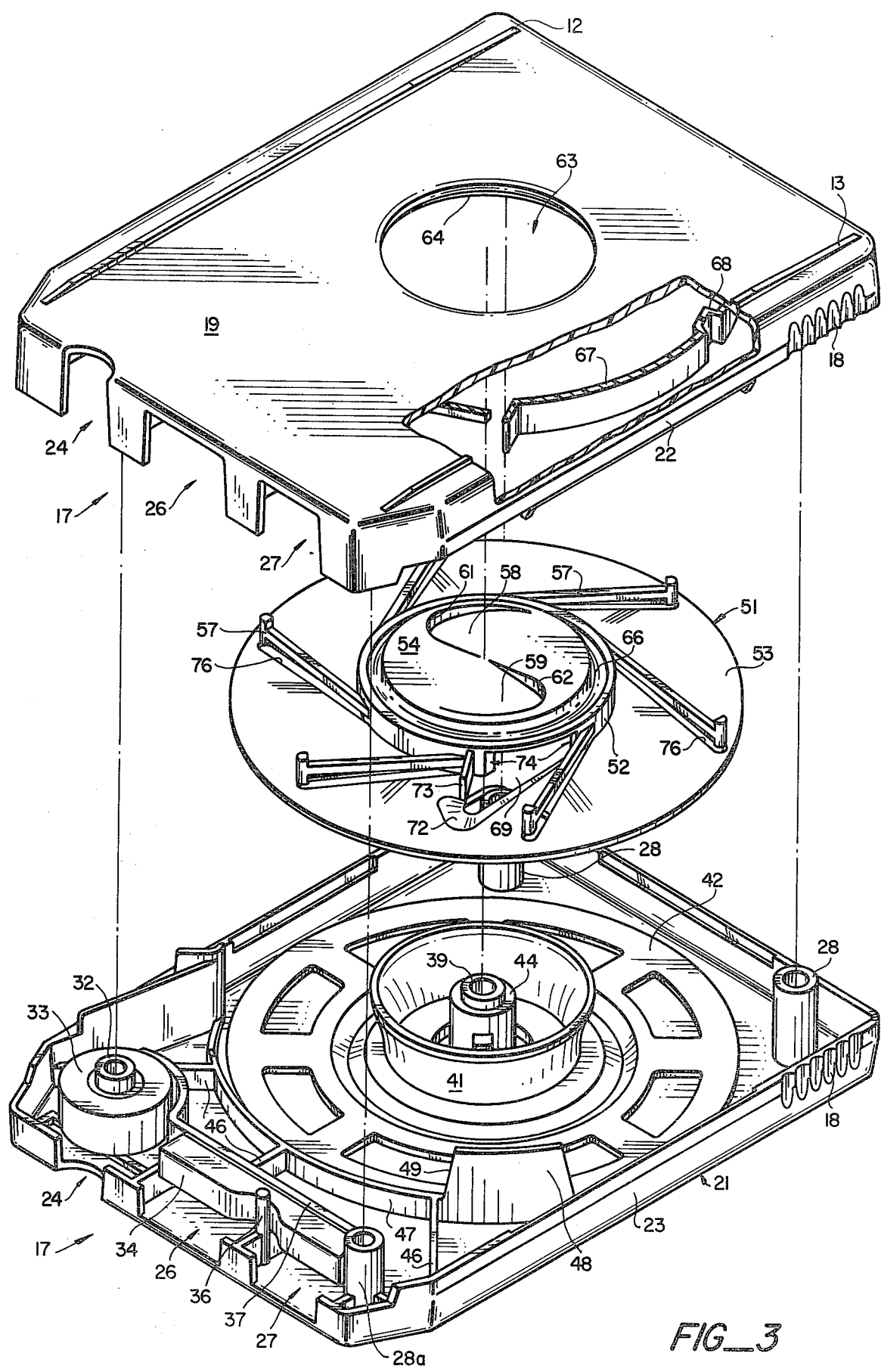
FIG_3

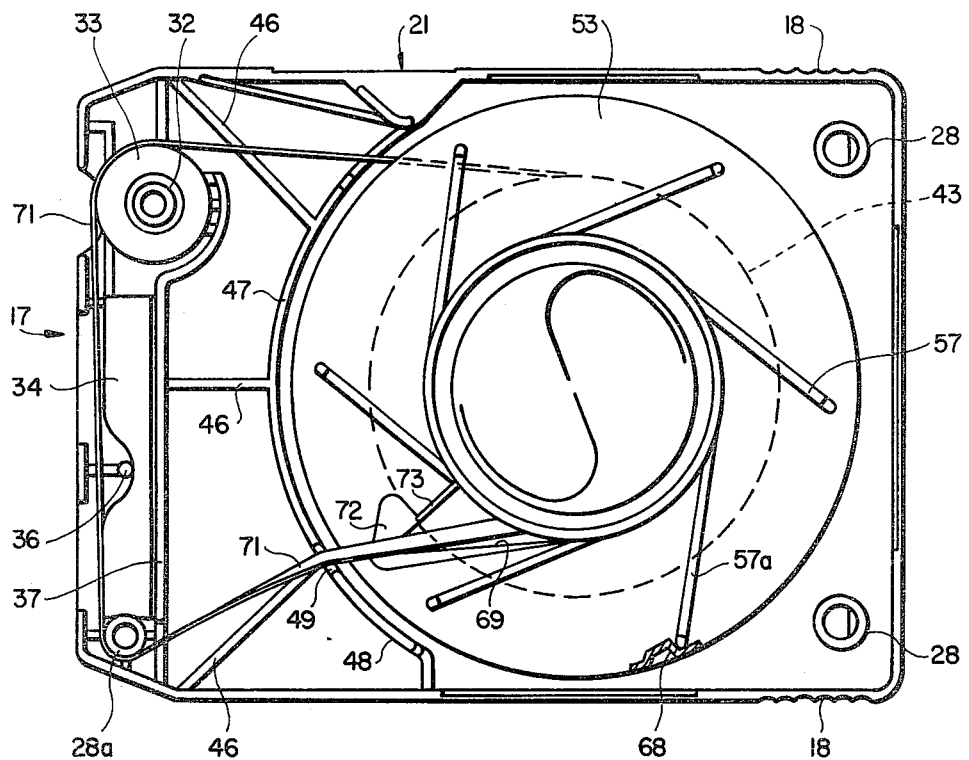
FIG_4
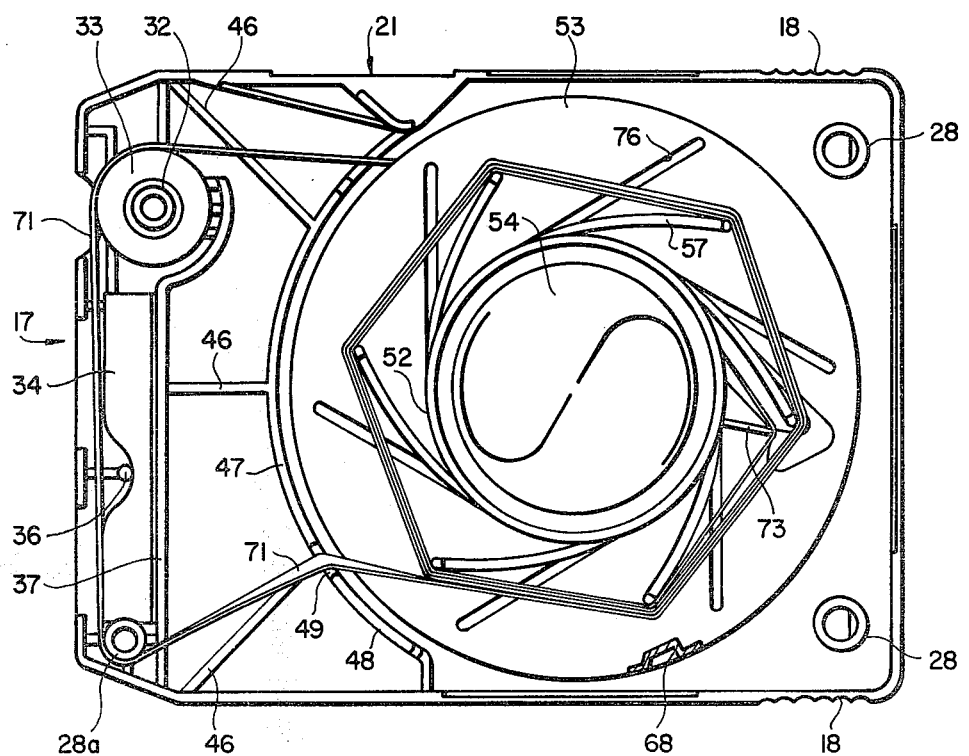
FIG_5

CONTINUOUS LOOP TAPE CARTRIDGE INCLUDING REWIND MEANS

BACKGROUND OF THE INVENTION

This invention relates generally to a continuous loop tape cartridge and more particularly to a continuous loop tape cartridge including rewind means.

Tape-like mediums are employed in the recordation of sound, information, digital data and visual images. Such mediums have included magnetic tape, electrostatic tape and film.

It has become common practice, especially in the magnetic tape field, to provide such tape-like mediums in cartridges. Such cartridges have included those which house a pair of spaced reels that can alternately act as take-up and supply reels whereby the tape can be easily rewound for editing and repeating. Another type of extensively used cartridge is the continuous or mobious loop cartridge. In this type of cartridge, a tape coil is carried by a hub disposed in the cartridge housing. The tape is removed from the center convolution of the coil and wound on the outer convolution of the coil. Tape slippage accommodates for the difference in circumferential distance traveled by the inner and outer convolutions. A drawback with such systems has been the inability to rewind or reverse the tape travel for editing and replay.

Several reversible continuous loop cartridges are known. U.S. Pat. Nos. 3,894,699; 3,924,269; and 4,015,789 describe a cartridge tape player and a cartridge in which the tape can be reversibly driven. In the rewind mode of operation, the tape is driven by being removed from the outer convolution of the coil and returned to the hub at the inner convolution. The cartridge and apparatus are relatively complex and costly. A special apparatus is required for rewinding the tape.

U.S. Pat. No. 3,999,719 describes a reverse mechanism for continuous loop tape cartridge. More particularly, the cartridge includes a tape reel and a rewind reel coaxially mounted. The tape reel and rewound reel are driven by drive wheels which engage the tape on the respective reels. The wheels are driven by the cartridge back-up roller via suitable drive means such as a drive belt. the capstan of the associated player provides the forward and reverse drive forces for driving the tape in the forward and reverse direction. The rewind reel includes a one-way clutch means so that it does not drive the associated tape and reel in the forward direction. Although the cartridge is simpler than those described above, it is still relatively complex and expensive to manufacture.

In my U.S. Pat. No. 3,252,670 there is described a reversible cartridge in which the tape is reversibly driven by drawing it from the outer convolution of the winding or coil and employing the coil to frictionally rotate an associated take-up reel which rests upon the coil. The take-up reel includes means for assuring that the diameter of the reel is substantially equal to the diameter of the outer convolution of the main winding. The two reels interact providing possibility of uneven forces giving rise to wow and flutter.

OBJECTS AND SUMMARY OF THE INVENTION

It is a general object of the present invention to provide a reversible continuous loop tape cartridge which can be used with conventional tape players.

It is another object of the present invention to provide an improved continuous loop tape cartridge including rewind means.

It is another object of the present invention to provide a continuous loop tape cartridge including rewind means which is simple in construction and inexpensive to manufacture.

It is another object of the present invention to provide a continuous loop tape cartridge including rewind means in which the rewind means is positively driven, and all possibility of slippage and slackening of the tape is avoided.

It is another object of the present invention to provide a continuous loop tape cartridge including rewind means which may be manually or mechanically driven.

The foregoing and other objects of the invention are achieved by a continuous loop tape cartridge comprising a housing having a top and bottom wall and side walls forming an enclosure, a first hub is rotatably carried within said housing for supporting a coil of tape with a portion of the tape extending between the inner and outer convolutions of the coil, a rewind reel including a disc is coaxially rotatably supported within said housing above said coil of tape, said disc includes a slot through which said portion of tape extends, an opening is formed in the upper wall of said housing to expose a portion of said rewind reel whereby said portion can be positively driven to withdraw tape from the outer convolution of the coil and wind the same onto said rewind reel.

BRIEF DESCRIPTION OF THE DRAWINGS

FIG. 1 is a perspective view of a tape cartridge in accordance with the invention.

FIG. 2 is a sectional view taken along the line 2—2 of FIG. 1.

FIG. 3 is an exploded view of the tape cartridge.

FIG. 4 is a plan view with the top removed showing the tape in the forward drive mode.

FIG. 5 is a plan view with the top removed showing the tape in the rewind mode.

DESCRIPTION OF THE PREFERRED EMBODIMENT

Referring particularly to FIGS. 1 through 3, the continuous loop tape cartridge includes a housing designated generally by the numeral 11. The cartridge housing is configured and sized so that it can be used in connection with a conventional tape deck. The cartridge includes spaced upper guide ridges 12 and 13 and lower guide edges 14 and 16. The ridges and edges guide the cartridge into the tape deck so that the front end 17 cooperates with the capstan and magnetic heads. Vertical notches or grooves 18 permit grasping the cartridge for insertion and removal.

The cartridge includes a top housing portion 19 and a bottom housing portion 21. Each of the housing portions includes downwardly extending and upwardly extending integral wall portions 22 and 23 respectively which cooperate to form the side walls, rear wall and front wall. The front wall portions include cutouts so that when they cooperate they provide openings 24, 26 and 27 which serve to accommodate the capstan and heads of an associated tape player or deck. The lower portion of the cartridge is provided with spaced upstanding posts 28 (FIG. 3) which cooperate with downwardly extending pins or posts (not shown) to lock the housing portions 19 and 21 cartridge together to form the cartridge of FIG. 1. The post 28a also serves to guide the tape that travels across the front of the cartridge adjacent the openings 24, 26 and 27. A post 32 is adapted to receive and rotatably mount a backup roller 33 disposed adjacent the opening 24. The upper and lower walls of the cartridge adjacent the opening 24 include cutouts whereby a capstan can pinch the tape between the capstan and roller to provide the driving force for driving the tape past the magnetic heads during a playing mode. Suitable pressure means is provided behind the tape at the windows 26 and 27 and may, for example, comprise a spongelike material 34 disposed between upstanding post 36 and the wall 37.

The bottom portion of the cartridge is formed with a hollow shaft 39 which receives the hub 41 and associated flange 42 which form a main reel which receives and holds the coil of magnetic tape 43, FIG. 2. The hub includes a central cylindrical sleeve 44 which is journaled on the shaft 39 and provides for rotatably mounting the reel. Referring to FIG. 3, the lower housing portion includes reinforcing ribs 46 and a wall 47 adjacent the reel. A wall portion 49 extends upwardly to engage the upper housing and presents a guide surface 49. The parts thus far described are found in conventional mobius or continuous loop tape cartridges.

In accordance with the present invention, a takeup reel 51 is rotatably carried by the shaft 39. The reel includes a hub 52 and a plate or disc 53. A hub plate 54 is formed integral with the hub 52 and includes a downwardly extending shaft 56 which extends into the hollow shaft 39. The hub and shaft are configured so that the flange 53 is spaced above the coil of magnetic tape whereby the takeup reel may rotate independently of the main reel. In the embodiment shown, a plurality of flexible fingers 57 extend outwardly from the shaft. The hub plate 54 includes two sloping surfaces 58 and 59 which terminate in wall-like stops 61 and 62 respectively whereby when a finger or other object is placed on the hub plate and rotated counterclockwise it will slide down the inclined surface and engage the upstanding wall 61 or 62 and drive the hub. Rotation of the object in the opposite direction will not provide rotative force, except for frictional forces of the object against the inclined surfaces.

The upper cartridge portion 19 includes an opening 63. The hub plate 54 extends through the opening and permits rotation of the takeup reel 51 for purposes to be presently described. The opening 63 includes a lip or ridge 64 which cooperates with a groove 66 in the hub plate to provide a tortuous path making it difficult for dust and the like to enter the cartridge. The upper housing portion includes a ridge 67 with a stop abutment 68 for purposes to be presently described. The plate 53 includes an opening 69. The tape 71 withdrawn from the lower coil (FIG. 2) extends up through the opening and over the flange 53. The opening includes sloped sides 72. A plate 73 extends outwardly from the hub adjacent one side of the opening. The hub also includes an opening 74 to permit the tape to extend upwardly through opening 69 and over the flange 53. In rewind the plate 73 engages and holds the tape in a vertical position so that it may be engaged by the extending fingers 57.

The complete cartridge and parts thereof may be formed by injection molding. For example, the upper and lower housing portions may be each individually formed by injection molding, the hub and flange plate or disc forming the main reel may be formed in a single injection molding. The upper or takeup reel may also be formed in a single injection molding. The extending arms 57 may be formed by injection molding since the mold may extend upwardly through opening 76 formed in the plate 53. Thus, the cartridge portions are simple in construction, may be molded by injection molding, and are relatively inexpensive.

The operation of the reel for normal and rewind is illustrated and described, with reference to FIGS. 4 and 5 which show top views of the reel with the top portion removed. In FIG. 4 the normal operation of the cartridge is illustrated. Thus, the tape is carried as a coil 43 and has its inner convolution extending upwardly past the slanted hub 41 (FIG. 3) through the opening 74 formed on the takeup reel hub flange and the opening 69 over the inclined edges 72 past the abutment 49 and over the post 28a. The tape makes a so-called S curve as it extends upwardly from the inner convolution over the flange plate 53 and outwardly to the post 28a. The tape then extends across the front of the cartridge adjacent the openings 24, 26 and 27 in front of the backup pad 34 over the backup roller 33 and onto the coil 43 as the outer convolution. In normal operation a capstan pinches the tape against the backup roller and the capstan pulls the tape from the inner convolution which causes the main hub and reel to rotate to take up the tape on the outer convolution. Since the outer convolution has a greater circumference or length than the inner convolution, the difference is taken up by slippage of the tape between adjacent convolutions in the coil.

Referring again to FIG. 4, the takeup reel is shown in its rest position with the arm 57a engaging the stop 68 whereby to prevent rotation of the takeup reel in the clockwise direction which would interfere with and engage the tape extending upwardly over the reel between the adjacent outwardly extending fingers 57. In essence then, in normal mode the takeup reel performs no functions whatsoever.

To rewind, a finger or object is placed on the hub plate 54 and moved in a counterclockwise direction so that it slides down one of the sloping surfaces 58 or 59 and it engages the upstanding wall 61 or 62 to thereby cause the hub and reel to rotate in a counterclockwise direction. As the reel is initially rotated, the plate 73 engages the tape causing the S curve to be more acute and causing the tape to assume a vertical position. As the reels continue to rotate, the first arm 57 will engage the tape and as as the reel rotates the successive arms engage the tape. The arms will accommodate so that their outside periphery is substantially equal to the periphery of the outer convolution of the tape on the coil 43. continued rotation continues to take up tape by unwinding it from the outer convolution of the coil 43 onto the rewind reel. As the tape is pulled from the lower reel it causes it to rotate. In addition, the plate 73 engaging the tape provides a rotative force. The upper and lower reels therefore substantially rotate in unison.

The flexible fingers or arms 57 collapse as the tape is rewound to maintain the outer diameters of the coils on the main and tape reels substantially equal. When the coil on the rewind reel expands to sufficient diameter, it will jam against abutment 68, thereby stopping rotation. It has been found that there can be as much as five to ten minutes of tape rewound before rewind stops.

When the rewind has been completed, the cartridge is inserted in the tape deck, the capstan pinches the tape between the backup roll and the capstan, and the tape is pulled from the rewind reel which causes both the rewind and main reel to rotate. The tape is unwound from the rewind reel and wound onto the main reel. When all of the tape is unwound from the rewind reel, the tape is pulled from the inner convolution of the coil 43. The rewind reel stops since the arm 57a strikes the abutment 68.

The rewind reel has been described as using flexible takeup arms 57. As explained, this permits the tape to slip and the arms cllapse to maintain substantially equal diameters for the coils on the main reel and the rewind reel. Collapsible arms also permit the use of a single takeup reel for various lower tape coil diameters such as encountered in 45-minute and 90-minute tape cartridges. It should be apparent, however, that the rewind reel may include fixed arms or hubs at the diameter of the main coil. The amount of rewind will be limited since there is no provision of adjusting diameter as described. It should also be apparent that other collapsing mechanisms may be used. For example, mechanisms such as those shown in my Pat. No. 3,252,670.

There are several optional design features which may be added to the design described above. For example, a gear set can be added inside the drive hub 52 to multiply the speed of rewind to 2:1, 3:1 or greater. It is also possible to add a counter to read out the rewind distance. The hub plate may include gears or the like which cooperate with a rewind means such as might be built into a tape player to provide rewind.

This present invention can work equally as well wth film and other information storage systems. For example, in the computer field, it can offer reduced access time compared to reel-to-reel tape, and in operation is equivalent to a very large, narrow drum.

It is also apparent that the invention can be incorporated to great advantage in the fourtrack cartridges now standard in the broadcast field. This can be extremely useful in those cases where cartridges are miscued shortly before air time, or for other general review purposes.

Thus, there has been developed a tape cartridge of the endless loop type which has a takeup reel coaxially mounted with a supply reel. The takeup reel can be manually or mechanically driven to rewind tape from the main reel to the takeup or rewind reel. In the forward direction the tape is pulled back off the takeup reel until the rewind start point is reached at which time the tape is pulled out of the center of the coil in normal fashion. The added parts to perform the rewind function are inexpensive to manufacture and the design offers vastly more flexible continuous loop cartridges.

What is claimed is:

1. A continuous loop tape cartridge comprising a housing, a first reel rotatably carried within said housing for supporting a coil of tape with a portion of the tape extending between the inner and outer convolutions of the coil, a rewind reel independently coaxially rotatably supported within said housing above said first reel, said rewind reel including a slot through which a tape supported by the first reel may extend from the inner to the outer convolution, and an opening formed in the upper wall of said housing to expose a portion of said rewind reel whereby said portion can be positively driven to withdraw tape from the outer convolution of the coil and wind tape onto said rewind reel.

2. A continuous loop tape cartridge as in claim 1 in which said rewind reel includes a hub having a hub plate disposed at said opening so that it may be engaged to drive the rewind reel.

3. A continuous loop tape cartridge as in claim 2 in which said hub plate includes at least one sloping surface terminating in a stop adapted to be engaged to rotate the rewind reel.

4. A continuous loop tape cartridge as in claim 1 in which said rewind reel includes tape receiving means having substantially the same diameter as a coil of tape carried by the first reel.

5. A continuous loop tape cartridge as in claim 4 in which said tape receiving means accommodates to the diameter of the coil of tape carried by the first reel.

6. A continuous loop tape cartridge as in claim 5 in wich said tape receiving means comprises a plurality of outwardly extending flexible arms.

7. A tape reel as in claim 6 in which said cartridge includes a stop and one of said arms is adapted to engage said stop.

8. A continuous loop tape cartridge comprising a housing having upper and lower housing walls with openings for receiving drive means and transducers, a shaft extending upwardly from said lower housing wall, a firstreel including a hub and flange rotatably carried by said shaft, said first reel adapted to receive a main coil of tape with a portion of the tape extending between the inner and outer convolutions past said openings, a rewind reel including a hub and flange independently rotatable carried by said shaft spaced above said main coil, an opening formed in said rewind reel permitting said portion of tape to pass over said rewind reel flange, an opening formed in the upper housing wall of said cartridge to expose the rewind reel hub and tape receiving means on said rewind reel for receiving a coil of tape whereby when the rewind reel hub is rotated said tape receiving means permit the tape to form a coil on said rewind reel as the tape is withdrawn from the outer convolution of the main coil.

9. A continuous loop tape cartridge as in claim 8 in wich said tape receiving means accommodates to the diameter of the coil of tape carried by the first reel.

10. A continuous loop tape cartridge as in claim 9 in which said tape receiving means comprises a plurality of outwardly extending flexible arms.

11. A tape reel as in claim 10 in which said cartridge includes a stop and one of said arms is adapted to engage said stop.

12. A continuous loop tape cartridge comprising a housing, a first reel rotatably carried within said housing for supporting a coil of tape with a portion of the tape extending between the inner and outer convolutions of the coil, a rewind reel independently coaxially rotatably supported within said housing above said first reel, said rewind reel including a slot through which a tape supported by the first reel may extend from the inner to the outer convolution, an opening formed in a wall of said housing, and means cooperating with said rewind reel through said opening to positively drive said rewind reel to withdraw tape from the outer convolution of the coil and wind tape onto said rewind reel.

13. A continuous loop tape cartridge as in claim 12 in which said means cooperating with said reel comprises a hub having a hub plate disposed at said opening so that it may be engaged to drive the rewind reel.

* * * * *

UNITED STATES PATENT AND TRADEMARK OFFICE
CERTIFICATE OF CORRECTION

PATENT NO. : 4,155,514
DATED : May 22, 1979
INVENTOR(S) : Kobert R. Smith II

It is certified that error appears in the above-identified patent and that said Letters Patent are hereby corrected as shown below:

Spelling of inventor's name is corrected at [76] to read:
Kobert R. Smith II

Signed and Sealed this

Ninth Day of October 1979

[SEAL]

Attest:

RUTH C. MASON
Attesting Officer

LUTRELLE F. PARKER
Acting Commissioner of Patents and Trademarks